(12) United States Patent
Ritosa et al.

(10) Patent No.: US 10,490,991 B2
(45) Date of Patent: Nov. 26, 2019

(54) BUSBAR FOR BONDING CONNECTIONS

(71) Applicant: ERICO INTERNATIONAL CORPORATION, Solon, OH (US)

(72) Inventors: Andrew Ritosa, Solon, OH (US); Derek Gregg, Seven Hills, OH (US); Steve Szczencinski, Clay, MI (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 16/022,344

(22) Filed: Jun. 28, 2018

(65) Prior Publication Data

US 2019/0006832 A1  Jan. 3, 2019

Related U.S. Application Data

(60) Provisional application No. 62/527,095, filed on Jun. 30, 2017.

(51) Int. Cl.
*H02G 5/00* (2006.01)
*H02G 5/02* (2006.01)
*H02G 3/04* (2006.01)
*H02G 3/08* (2006.01)
*H01R 4/64* (2006.01)
(Continued)

(52) U.S. Cl.
CPC ............. *H02G 5/025* (2013.01); *H01R 4/42* (2013.01); *H01R 4/64* (2013.01); *H01R 13/621* (2013.01); *H01R 25/162* (2013.01); *H02G 3/04* (2013.01); *H02G 3/0437* (2013.01); *H02G 3/081* (2013.01); *H02G 5/02* (2013.01); *H01R 4/643* (2013.01)

(58) Field of Classification Search
CPC ...... H02G 5/025; H02G 3/0437; H02G 3/081; H02G 5/02; H02G 5/00; H01R 4/52; H01R 4/64; H01R 13/621; H01R 25/162; H01R 4/643
USPC .... 174/149 B, 72 B, 68.2, 71 B, 88 B, 99 B, 174/129 B, 133 B, 70 B; 361/611, 637, 361/648, 775, 600, 624
See application file for complete search history.

(56) References Cited

U.S. PATENT DOCUMENTS 3,133,779 A   5/1964   Stanback
4,325,529 A   4/1982   Seebinger
(Continued)

FOREIGN PATENT DOCUMENTS

CN   206059682 U   3/2017
EP   3043433 A1   7/2016

OTHER PUBLICATIONS

Harger; Ground Bars & Accessories product list; Copyright 2017 Harger Lightning & Grounding; 3 pages.
(Continued)

*Primary Examiner* — Angel R Estrada
(74) *Attorney, Agent, or Firm* — Quarles & Brady LLP

(57) ABSTRACT

A busbar is provided for attaching a conductor to a support structure. The busbar can include a main bonding wall, a first mounting wall extending away from a first end of the main bonding wall, a second mounting wall extending away from a second end of the main bonding wall. A first flap can extend at an angle from the first mounting wall towards the second mounting wall and the main bonding wall, or a second flap can extend at an angle from the second mounting wall towards the first mounting wall and the main bonding wall.

19 Claims, 8 Drawing Sheets

(51) Int. Cl.
*H01R 25/16* (2006.01)
*H01R 13/621* (2006.01)
*H01R 4/42* (2006.01)

(56) References Cited

U.S. PATENT DOCUMENTS

| | | | |
|---|---|---|---|
| 5,428,913 A | 7/1995 | Hillstrom | |
| 5,702,081 A | 12/1997 | Gallemore, II | |
| 5,732,915 A | 3/1998 | Heard | |
| 6,185,303 B1 * | 2/2001 | Losey | B25H 3/00 |
| | | | 248/219.4 |
| 6,189,488 B1 | 2/2001 | Goldsher et al. | |
| 6,229,948 B1 * | 5/2001 | Blee | G02B 6/483 |
| | | | 385/134 |
| 6,486,399 B1 * | 11/2002 | Armstrong | H05K 5/0204 |
| | | | 174/58 |
| 6,550,170 B1 | 4/2003 | Cooper et al. | |
| 6,766,992 B1 * | 7/2004 | Parker | F16M 13/022 |
| | | | 248/218.4 |
| 6,888,066 B1 * | 5/2005 | Wiant | H02B 1/21 |
| | | | 174/68.2 |
| 6,969,034 B2 | 11/2005 | Ware et al. | |
| 6,988,697 B2 | 1/2006 | Ware et al. | |
| 7,059,572 B2 | 6/2006 | Ware et al. | |
| 7,449,635 B2 * | 11/2008 | Wiant | H02B 1/21 |
| | | | 174/68.2 |
| 7,712,283 B2 | 5/2010 | Gadd et al. | |
| 7,827,757 B2 | 11/2010 | Gadd et al. | |
| 8,181,916 B2 | 5/2012 | Azuma et al. | |
| 8,225,575 B2 | 7/2012 | Gadd et al. | |
| 8,480,414 B2 | 7/2013 | Carnevale et al. | |
| 8,540,194 B2 | 9/2013 | Azuma et al. | |
| 8,540,201 B2 | 9/2013 | Gadd et al. | |
| 8,809,680 B2 | 8/2014 | Kiely | |
| 8,955,286 B2 | 2/2015 | Gadd et al. | |
| 9,373,947 B2 | 6/2016 | Kohnen | |
| 9,472,935 B1 * | 10/2016 | Gretz | H02G 3/10 |
| 9,660,397 B2 | 5/2017 | Islam et al. | |
| 9,728,909 B2 | 8/2017 | Islam et al. | |
| 9,810,369 B2 * | 11/2017 | Lilieholm | H01O 1/1207 |
| 9,985,422 B2 * | 5/2018 | Jett | H02B 1/50 |
| 2010/0203775 A1 | 8/2010 | Howard et al. | |
| 2011/0237140 A1 | 9/2011 | Cerasale | |
| 2012/0264327 A1 | 10/2012 | Carnevale et al. | |
| 2015/0083875 A1 | 3/2015 | Lloyd | |

OTHER PUBLICATIONS

ABB; Earth bonds & clamps product list; Copyright 2018 ABB; 5 pages.
Storm Power Components; Grounding Bar, Ground Bar Kits & Brackets product list; Copyright 2018 Storm Power Components; 3 pages.

* cited by examiner

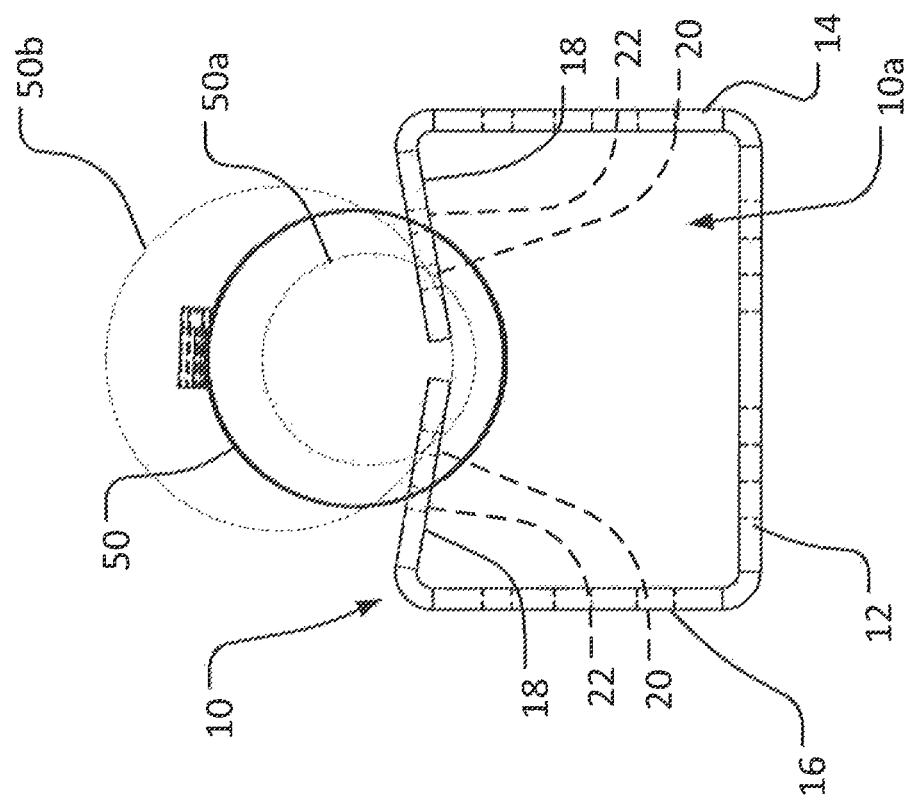
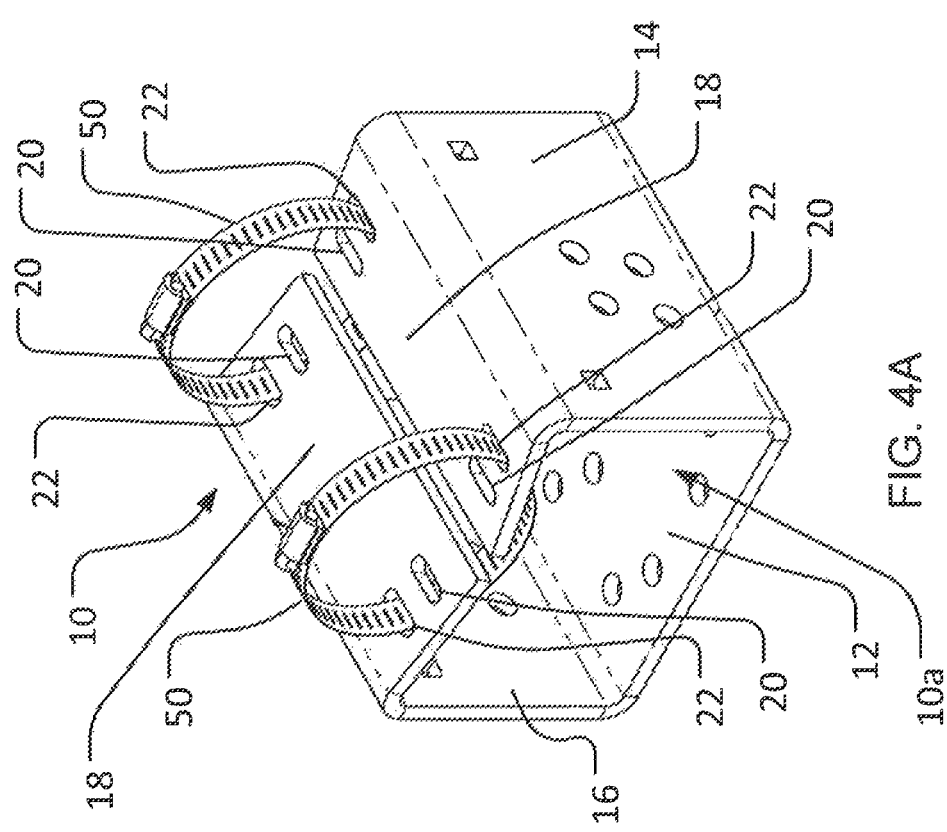
FIG. 4A
FIG. 4B

BUSBAR FOR BONDING CONNECTIONS

CROSS-REFERENCE TO RELATED APPLICATIONS

This application claims priority to U.S. Provisional Patent Application No. 62/527,095, titled "Busbar for Grounding Connections" and filed Jun. 30, 2017, the entirety of which is incorporated herein by reference.

BACKGROUND

In electrical power distribution, busbars are often used for bonding electrical circuits and devices. Conventionally, busbars are configured to support excessively large currents that may occur during a short circuit or lightning strike and can be designed to dissipate heat generated by such currents by providing a high surface area to cross-sectional area ratio. When a number of active wires (or other conductors) need to be bonded, each of the active wires can be coupled to a busbar, which can in turn be bonded. By having one single ground conductor connected to the busbar, the plurality of active wires coupled to the busbar can be simultaneously grounded, thereby reducing the number of wires (or other conductors) needed to extend to the ground source.

In some contexts, the use of busbars may be highly important. For example, in the telecommunication industry, telecommunication towers often support numerous pieces of equipment that require grounding. For example, a 4G tower may support antennas, transmitters, receivers, digital signal processors, control electronics, GPS receivers, and electrical power sources, all of which may require grounding. Because these towers can be several hundred feet tall, bonding each of these pieces of equipment separately would be technically impractical, requiring substantial lengths of conductors, as well as financially unfavorable. In contrast, relatively low cost and high connectivity can make busbars an attractive alternative.

SUMMARY

Some embodiments of the invention provide a busbar that can be readily mounted to a number of different surfaces.

Some embodiments of the invention provide a busbar for attaching a conductor to a support structure. A main bonding wall can have a first end and a second end. A first mounting wall can extend away from the first end of the main bonding wall. A second mounting wall can extend away from the second end of the main bonding wall. The busbar can include at least one of: a first flap extending at an angle from the first mounting wall towards the second mounting wall and the main bonding wall, or a second flap extending at an angle from the second mounting wall towards the first mounting wall and the main bonding wall.

Some embodiments of the invention provide a busbar for selective attachment to a first round support structure of a first diameter, a second round support structure of a second diameter different from the first diameter, and a flat support structure, in order to selectively secure bonding connections relative to the first round support structure, the second round support structure, or the flat support structure. A single-piece body can include a base wall, first and second side walls extending from opposite ends of the base wall, a first flap extending at a first acute angle from the first side wall opposite the base wall, and a second flap extending at a second acute angle from the second side wall opposite the base wall. Each of the first and second flaps can include one or more sets of round-structure mounting openings. At least one of the base wall, the first side wall, or the second side wall can include one or more sets of flat-structure mounting openings. At least one of the base wall, the first side wall, or the second side wall can include one or more sets of bonding openings configured to secure one or more of the bonding connections to the busbar. The one or more sets of round-structure mounting openings can be configured to receive one or more hose clamps to selectively secure the busbar to the first round support structure and the second round support structure, with the first and second flaps urged into engagement with the first round support structure and the second round support structure, respectively. The one or more sets of flat-structure mounting openings can be configured to receive one or more clamp assemblies to selectively secure the busbar to the flat support structure.

Some embodiments of the invention provide a method of manufacturing a busbar that is configured to be selective attached to a first round support structure of a first diameter, a second round support structure of a second diameter different from the first diameter, and a flat support structure, in order to selectively secure grounding connections relative to the first round support structure, the second round support structure, or the flat support structure. A single-piece copper blank can be provided. The single-piece copper blank can be stamped to form a plurality of mounting openings and a plurality of bonding openings, a first wall that includes a first set of the plurality of bonding openings, second and third walls that extend from opposite ends of the first wall and that include, respectively, second and third sets of the pluralities of bonding openings and at least one of the mounting openings that is configured to attach of the busbar to the flat support structure, and first and second flaps extending at acute angles from the second and third walls, respectively, with the first and second flaps including, respectively, first and second sets of the plurality of mounting openings that are configured to attach the busbar to the first and second round support structures, respectively.

DESCRIPTION OF THE DRAWINGS

FIG. 4A is an isometric view of the folded busbar of FIG. 1 with hose clamps attached thereto.

FIG. 4B is a front view of the folded busbar of FIG. 1 and hose clamps arranged as in FIG. 4A.

DETAILED DESCRIPTION

Figure 1:
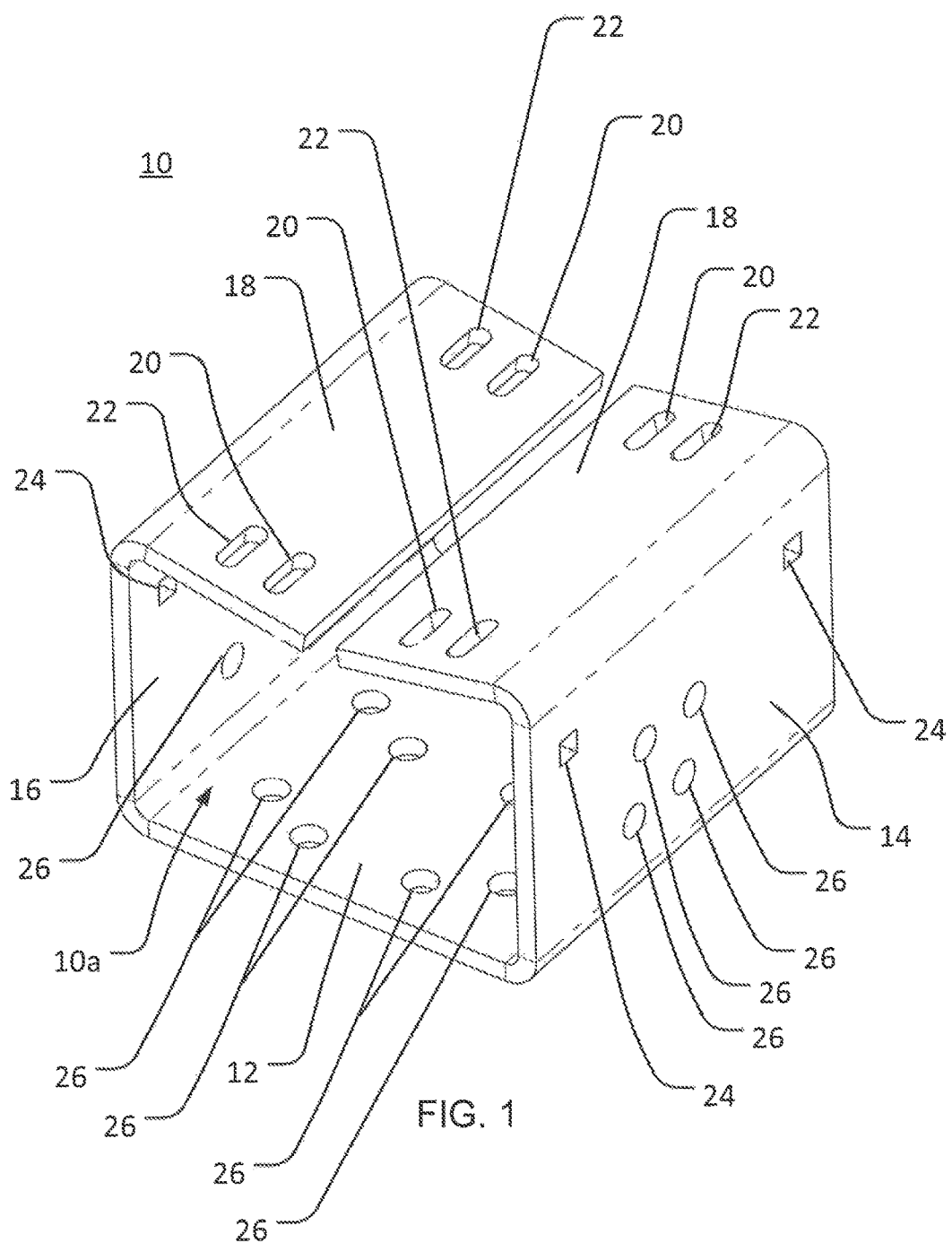
FIG. 1 is an isometric view of a folded busbar according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, "ground" or "grounding" refers to a connection by which an electric circuit or electrical equipment is connected to the earth or to a conducting body that is sufficiently large to essentially mimic the earth. Also as used herein, unless otherwise specified or limited, "bond" or "bonding" refers to the electrical interconnecting of conductive parts in order to maintain a common electrical potential. In some cases, bonding can refer to electrical interconnection as specified in relevant standards, such as National Electric Code NFPA 70®. (NFPA 70 is a registered trademark of the National Fire Protection Association in the United States and/or other jurisdictions.)

In some conventional arrangements, equipment on a telecommunication tower or other elevated structures is grounded by connecting a bonding conductor to a ground bar mounted to the tower or other structure itself. Because different types of electrical equipment can be placed about the tower, this grounding configuration can often require relatively long lead lengths, and can thereby add relatively significant resistance to the grounding system. Similarly, conventional arrangements can be awkward to mount, and can be poorly configured for attachment to surfaces of different shapes and sizes.

Embodiments of the invention can address these and other shortcomings of conventional bonding arrangements. In this regard, for example, some busbars according to the invention can be relatively easily installed at a number of different locations on a tower or other structure, can support multiple bonding connections, and can be securely mounted to surfaces (e.g., tower surfaces) of different sizes and profiles. Some embodiments of the invention can be configured as folded busbars, with multiple receiving openings for bonding connections, and with angled mounting flaps that allow the busbars to be easily mounted to rounded surfaces (e.g., cylindrical towers) of different characteristic diameters.

In some embodiments, busbars according to the invention can be configured to include angled flaps that extend towards each other from opposite sides of a busbar body. Usefully, in some arrangements, outwardly oriented faces of the angled flaps can be seated against round support structures (e.g., round towers) of different characteristic diameters to securely mount the busbar to the support structures.

FIG. 1 illustrates a folded busbar 10 according to one embodiment of the invention. In the embodiment illustrated, the folded busbar 10 is formed as an integral body that includes a main bonding wall 12, a first mounting wall 14, and a second mounting wall 16. Collectively, as illustrated in FIG. 1, the walls 12, 14, 16 collectively partly define a semi-closed recess 10a within the folded busbar 10.

In some embodiments, mounting walls of a busbar can be configured as angled flaps, which can be configured to help readily secure the busbar to round structures of a variety of different diameters. In the embodiment illustrated, for example, the folded busbar 10 further includes a set of flaps 18 that extend generally inwardly away from first mounting wall 14 and second mounting wall 16, to further define the recess 10a.

In some embodiments, flaps on a busbar may extend towards each other, but not sufficiently far so as to meet or overlap with each other. For example, the flaps 18 extend inwardly toward one another, without extending across the entire recess 10a. As illustrated in FIG. 1, for example, the distal ends of the two flaps 18 thereby together define a gap between the flaps 18 so that the recess 10a is open across the gap between the flaps 18, as well as at opposite ends of the folded busbar 10 (i.e., along the free edges of the walls 12, 14, and 16 and the flaps 18). This can be useful, for example, in order to allow the folded busbar 10 to be manufactured easily, including as a unitary body formed via stamping operations. In other embodiments, other configurations are possible, including configurations in which the flaps 18 extend fully across the recess 10a to contact or overlap with each other.

Generally, busbars according to the invention, including the folded busbar 10, can include a variety of different mounting features to receive a variety of different types and configurations of mounting (or other) hardware. In some embodiments, flaps of a busbar can include multiple mounting features to allow the busbar to be easily mounted to supports of different sizes. For example, the flaps 18 of the folded busbar 10 include a sets of openings formed as a first slot pair 20 and a second slot pair 22, each slot of which generally extends entirely through the relevant flap 18, and forms a generally oblong shape. In other embodiments, other configurations are possible, including openings not configured as slots, or sets of openings not configured as matching pairs.

In some embodiments, different sets of slots can be configured to receive different hardware and/or to secure a busbar to different sizes or types of structures. For example, in the embodiment illustrated, the respective slots pairs 20, 22 are generally configured to receive different sets of one or more hose clamps (not shown in FIG. 1) to mount the folded busbar 10 to a cylindrical pipe or other rounded surface of different characteristic diameters. In particular, the each of the first slot pairs 20 and the second slot pairs 22 are spaced laterally apart from one another, with the slots of each of the first slot pairs 20 between the slots of the corresponding second slot pair 22. Accordingly, for example, the respective slot pairs 20, 22 can each receive a hose clamp of a different size (not shown in FIG. 1) to secure the busbar 10 to different sizes of structures.

In some embodiments, the first slot pairs 20 may be configured to receive a hose clamp ranging in diameter between about 2 inches and about 4 inches, while the second slot pairs 22 may be configured to receive a hose clamp ranging in diameter between about 4 inches and about 6 inches. In some embodiments, other configurations are possible, including configurations in which slots of the first slot pairs 20 are configured to receive larger (or smaller) hose clamps and slots of the second slot pairs 22 are configured to receive smaller (or larger) hose clamps. Usefully, by accommodating a range of different hose clamp sizes, the slot pairs 20 and 22 can allow the folded busbar 10 to be easily coupled to pipes of different size. For example, through selective use of hose clamps within the ranges noted above (or others), the folded busbar 10 may be readily mounted to pipes having outer diameters ranging between about 1½ inch and about 5 inches. In other embodiments, other sizes of pipes (or other round structures) can also (or alternatively) be accommodated using the busbar 10 or another busbar according to the invention. Similarly, in some implementations, either set of the slot pairs 20 and 22 can be used for any number of different hose-clamp and pipe (or other round-structure) sizes.

In other embodiments, other configurations are possible. For example, one or more of the slots of the slot pairs 20 and 22 (or other sets of slots) can be differently sized or shaped, can be open on one or more sides, can be located at different absolute or relative locations, and so on. In some embodiments, for example, larger or smaller sizes of pipes (or other structures) can be accommodated by spacing the first slot pairs 20 and the second slot pairs 22, of the slots thereof, further apart from each other, or closer together.

In some embodiments, other mounting features can be configured to help secure a busbar to non-round (or other) structures. As one example of different kinds of mounting features, the first mounting wall 14 and the second mounting wall 16 of the folded busbar 10 include clamp holes 24, which are generally configured to receive a clamp assembly (not shown in FIG. 1) to help mount the folded busbar 10 to flat surfaces. In different embodiments, clamp holes (or other mounting openings) can exhibit different geometries. For example, the clamp holes 24 are provided with rectangular perimeters (e.g., with fully square or rounded corners), and extend entirely through the first mounting wall 14 and the second mounting wall 16. As also discussed below with reference to FIGS. 3A-3C, a variety of different clamp assemblies (e.g., beam clamp assemblies) can be configured to engage the clamp holes 24, to mount folded busbar 10 to a variety of different surfaces, such as flat surfaces on I-beams (e.g., S- or W-beams), H-beams, T-beams, or other flat surfaces that may require a grounding connection.

As another example of mounting features, the folded busbar 10 further includes a plurality of mounting holes 26, which are spaced about the main bonding wall 12, the first mounting wall 14, and the second mounting wall 16. In some embodiments, mounting holes on a busbar can be sized and arranged in order to accommodate attachment of particular hardware (e.g., bonding lugs). For example, the mounting holes 26 are disposed about the walls 12, 14, 16 in groups of two and four. This can be useful, for example, in order to accommodate attachment of double-hole (or other) bonding lugs (as also discussed below). In some configurations, the mounting holes 26 within particular groups can be spaced apart by about one inch, center to center.

In different embodiments, mounting holes can exhibit a variety of different sizes, and can be uniformly sized and shaped on a particular busbar or can exhibit different sizes and shapes on a particular busbar. In some embodiments, each mounting hole 26 is approximately 0.375 inches in diameter, and is configured to receive ⅜" hardware. In some embodiments, the main bonding wall 12 can include six groups of the mounting holes 26, while the first mounting wall 14 and the second mounting wall 16 can each include two groups of the mounting holes 26. In other embodiments, different numbers or other configurations are possible.

In different embodiments, different configurations of walls and other features of a busbar, and of junctions between walls and other features, are possible. In the embodiment illustrated, for example, as reflected in FIGS. 2A-2C, the main bonding wall 12 includes a substantially flat surface, which can, in some embodiments, be provided with a cross-sectional thickness of about 0.25 inches. Generally, the main bonding wall 12 includes a first end and a second end, where the first end is adjacent to the first mounting wall 14, and the second end is adjacent to the second mounting wall 16. The first end of main bonding wall 12 extends onto a first elbow at the first mounting wall 14, which defines an angle $\alpha_1$ and leads from the main bonding wall 12 to the first mounting wall 14. In some embodiments, the angle $\alpha_1$ is approximately 90°. In a similar configuration, the second end of the main bonding wall 12 extends onto a second elbow at the second mounting wall 16, which defines an angle $\alpha_2$ and leads from the main bonding wall 12 to the second mounting wall 16. In some embodiments, the angle $\alpha_2$ may also be approximately 90°.

From the first elbow at the angle $\alpha_1$, the first mounting wall 14 extends towards a third elbow that defines an angle $\beta_1$. One of the flaps 18 extends inwardly away from first mounting wall 14 at the angle $\beta_1$, towards the second mounting wall 16. Similarly, the second mounting wall 16 extends from the second elbow at the angle $\alpha_2$ towards a fourth elbow that defines an angle $\beta_2$. Another of the flaps 18 extends inwardly away from the second mounting wall 16 at the angle $\beta_2$, towards the first mounting wall 14.

In some embodiments, as also discussed below and as illustrated for the folded busbar 10, the angles β1 and β2 can be chosen to be less than 90° (i.e., to be acute angles), such that the flaps 18 also extend somewhat towards the main bonding wall 12 and provide a generally concave rounded-structure engagement interface. In some embodiments, the angles β1, β2 can be chosen to be approximately equivalent. For example, angles β1, β2 may be chosen to be between about 60° and about 90°, with both of the angles β1, β2 approximately equal to 80°. In some embodiments, the angles β1, β2 can be different from each other. In some embodiments, the angles α1, α2, β1, and β2 can be selected to collectively provide a generally concave rounded-structure interface. In some embodiments, one or more of the angles α1, α2, β1, and β2 can be formed as compound angles.

Figure 3A:
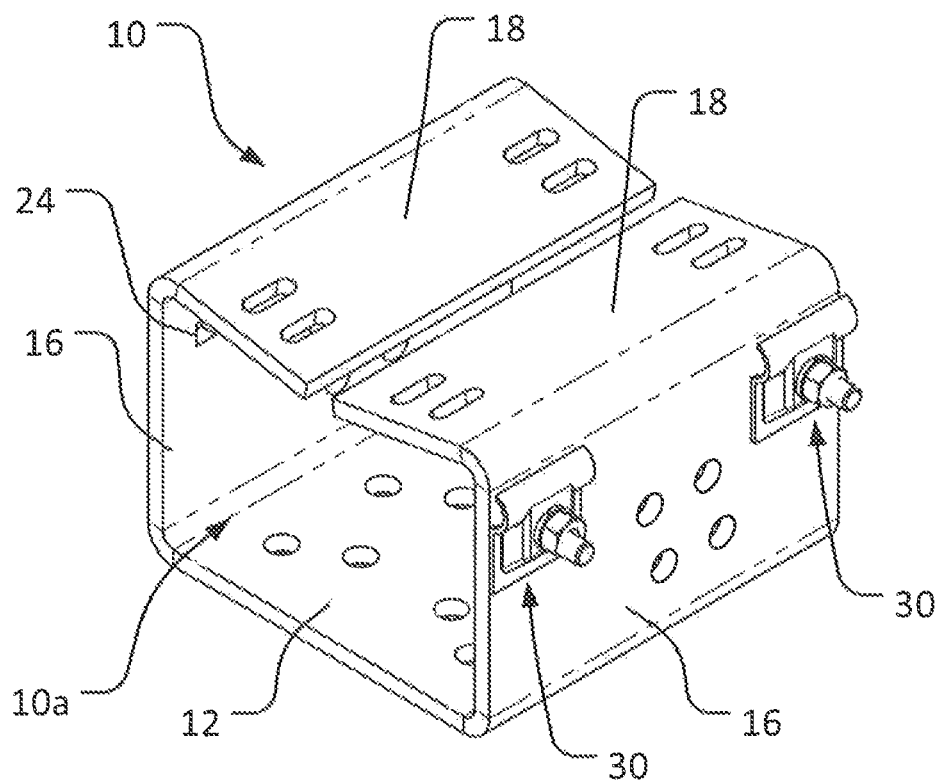
FIG. 3A is an isometric view of the folded busbar of FIG. 1 with an example beam clamp assembly mounted thereto.
Figure 3B:
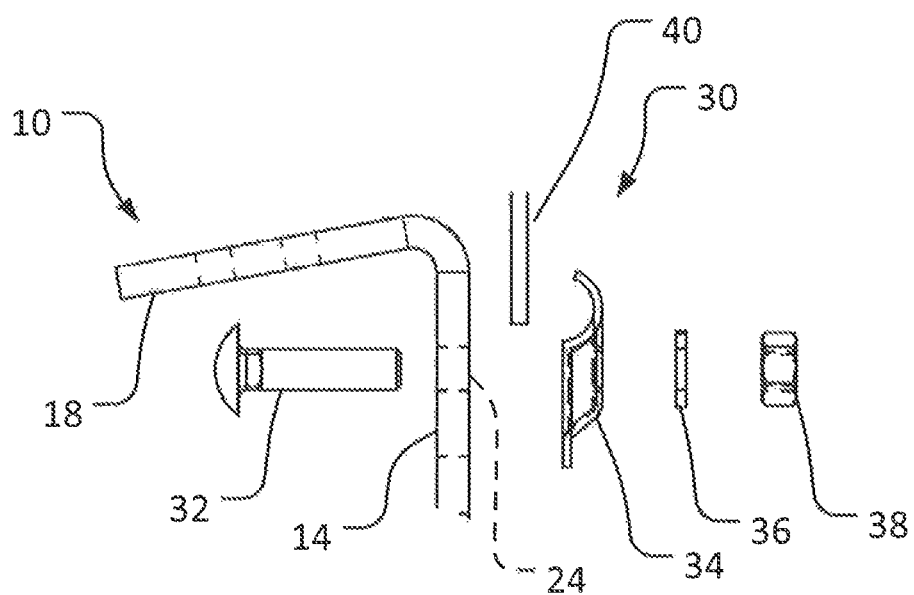
FIG. 3B is an exploded view of the beam clamp assembly of FIG. 3A.
Figure 3C:
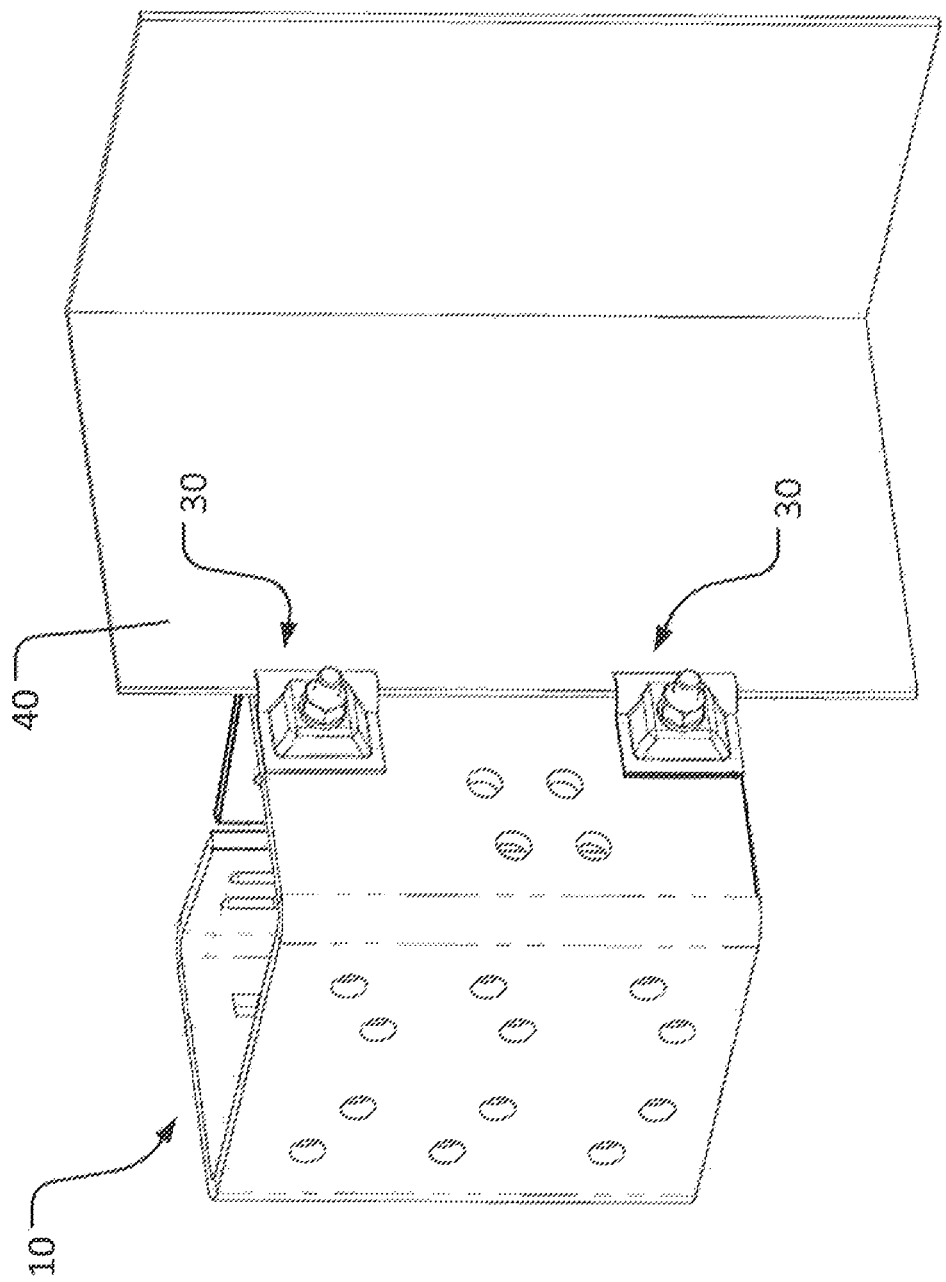
FIG. 3C is an isometric view of the folded busbar of FIG. 1 mounted to a flat surface using two of the beam clamp assemblies of FIG. 3A.

As noted above, embodiments of the invention can be configured to be secured to structures in multiple ways, thereby providing significant flexibility for installation and use. Turning now to FIGS. 3A-3C, for example, the folded busbar 10 is shown with an example clamp assembly configured as a beam clamp assembly 30, which can be used to mount the folded busbar 10 to a flat surface 40 (see FIGS. 3B and 3C). In some embodiments, the flat surface 40 may be an I-beam surface, H-beam surface, T-beam surface, flat bar, or any other appropriate flat surface. As shown in the figures, the beam clamp assembly 30 can generally extend through the clamp holes 24 to secure the folded busbar 10 to the flat surface 40. In the embodiment illustrated, the clamp holes 24 that are in use extend through the first mounting wall 14 so that the folded busbar 10 can be mounted as shown. In other embodiments, clamp holes extending through other walls of the folded busbar 10 (e.g., the second mounting wall 16) can be used.

In some embodiments, two or more of the walls 12, 14, and 16 can include at least two separate clamp holes 24, which can be configured to receive separate instances of the beam clamp assembly 30 (or other mounting hardware). Usefully, including at least two of the clamp holes 24, to accommodate at least two beam clamp assemblies (e.g., the beam clamp assemblies 30) on a particular one of the walls 12, 14, and 16, can help to provide an appropriately strong engagement with the relevant support structure (e.g., the flat surface 40). This may be useful, for example, because busbars according to the invention may be mounted several hundred feet in the air, and may accordingly be subjected to relatively high speed winds that can urge the busbars to swing away from the relevant mounting surface (e.g., the flat surface 40). In some arrangements, the use of at least two beam clamp assemblies 30, to couple the folded busbar 10 to the flat surface 40, can provide a relatively strong overall attachment, such that folded busbar 10 can remain secured to the flat surface 40 in nearly all foreseeable conditions. Further, this configuration can also allow forces—and the resulting stresses—to be more evenly distributed about the folded busbar 10, such that the assembly as a whole may be less likely to fail.

With reference now specifically to FIG. 3B, aspects of one possible configuration of the beam clamp assembly 30 is shown. As illustrated, for example, a bolt 32 of the beam clamp assembly 30 is configured to extend through any one of the clamp holes 24 of the folded busbar 10. In some embodiments, the head of the bolt 32 can be configured to seat against an interior surface of the first mounting wall 14, the second mounting wall 16, or the main bonding wall 12. In embodiments where the bolt 32 is a carriage bolt, the square portion of the carriage bolt may be sized to form a relatively tight clearance fit with any one of the clamp holes 24, which may also have a generally square shape. The relatively tight clearance fit between the bolt 32 and the clamp hole 24 (or other similar engagement) can usefully allow a user to torque the bolt 32 and nut 38 to a desired tightness using only a single tool, because bolt 32 may be generally prevented from rotating relative to clamp hole 24. This may be particularly beneficial, for example, during installation of the assembly at elevated locations.

While extended through the relevant clamp hole 24 (or other receiving opening), the bolt 32 can also be configured to extend through a through hole provided in a clamping body 34. Further, the clamping body 34 may generally be configured such that when axial loading is provided on a surface of the clamping body 34 (for instance, by appropriately torqueing the nut 38), a clamping portion of the clamping body 34 can elastically deflect to relatively firmly engage the flat surface 40. In this way, for example, the beam clamp assembly 30 can help to appropriately secure the folded busbar 10 at an appropriate location.

In some embodiments, the clamping body 34 (or other components of the beam clamp assembly 30) can be formed from stainless steel. This may, for example, allow the clamping body 34 to have a sufficiently strong structure to secure the folded busbar 10 to the flat surface 40, while also maintaining a high degree of corrosion resistance.

In some embodiments, the beam clamp assembly 30 may further include a washer 36 and a nut 38, which can generally be used to anchor the beam clamp assembly 30 in place relative to the flat surface 40 and the folded busbar 10. Accordingly, the bolt 32 may generally be configured to extend through the washer 36 and to be engaged by the nut 38. In some embodiments, the washer 36 can be a lock washer, designed to prevent any counter-clockwise motion of the nut 38 once it is torqued to a required value. Generally, the nut 38 can be a hex nut, jam nut, wing nut, cap nut, acorn nut, flange nut, square nut, or any other type of nut that can be configured to threadably engage the bolt 32. In some embodiments, the nut 38 may be a nylon insert nut or other type of nut that may not require a washer, such that the washer 36 may be omitted (as appropriate) from the beam clamp assembly 30.

While a specific configuration of the beam clamp assembly 30 is illustrated in FIGS. 3A-3C, this configuration has been provided only as an example. In other implementations, a number of other beam clamp assemblies can be used while still remaining within the scope of the present disclosure. For example, in some embodiments, C-clamps (not shown) or other similar hardware may be used to securely mount the folded busbar 10 to the flat surface 40 or to other flat surfaces. In some embodiments, for example, this may generally allow for the clamp holes 24 to be omitted from folded busbar 10.

Similarly, although the busbar 10 is illustrated as secured to the flat surface 40 in a particular configuration, this configuration is presented as an example only. In other installations, and with other embodiments, a busbar according to the invention, such as the folded busbar 10, can be secured to a flat surface of a variety of configurations, and in a variety of different orientations.

Figure 4C:
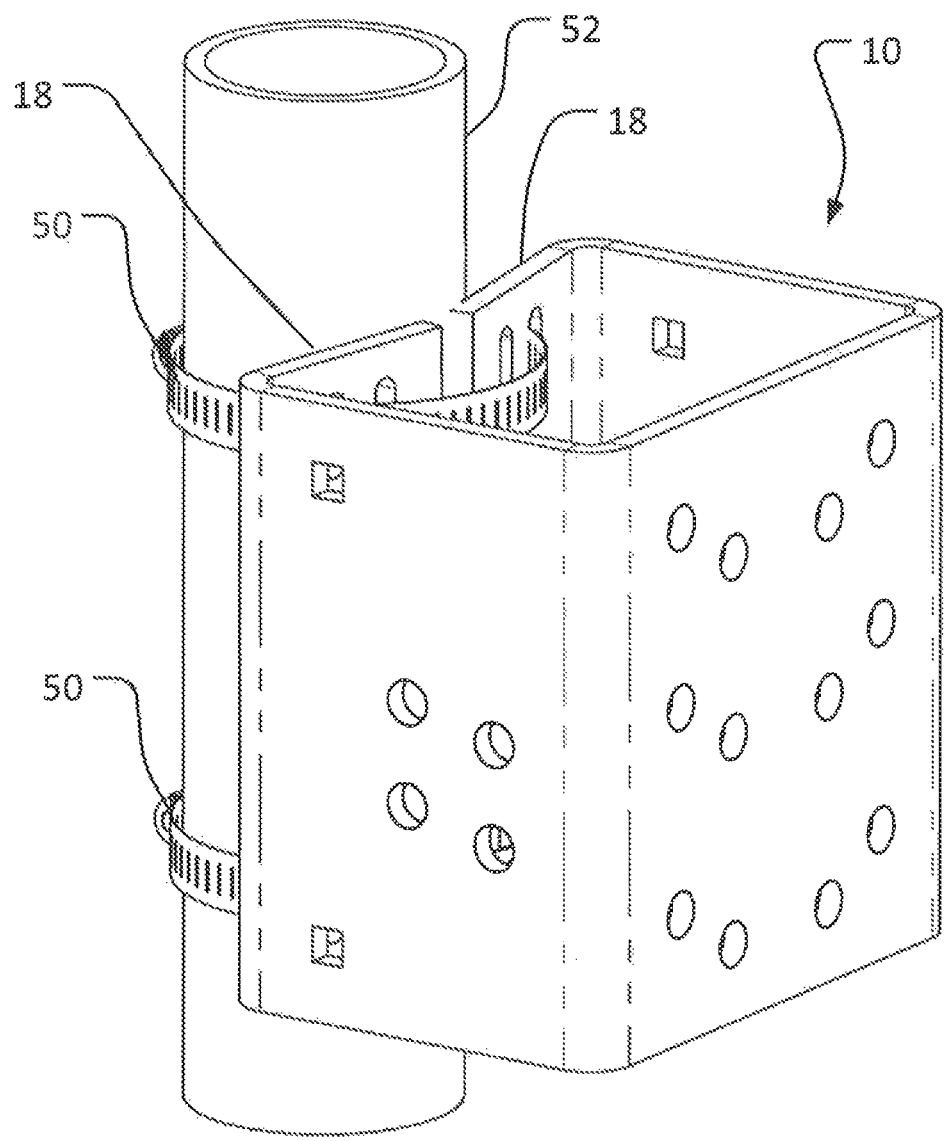
FIG. 4C is an isometric view of the folded busbar of FIG. 1 with the hose clamps of FIGS. 4A and 4B securing the folded busbar to a pipe.

Turning now to FIGS. 4A-4C, another approach to securing the folded busbar 10 to a structure is illustrated. In particular, the folded busbar 10 is shown with hose clamp assemblies 50 that can be configured to couple the folded busbar 10 to a rounded surface 52 (see FIG. 4C). In some embodiments, the rounded surface 52 may be part of a pole, a pipe, or other rounded surface to which it may be useful to secure the folded busbar 10.

Generally, to secure the folded busbar 10 to the rounded surface 52, a user may pass the hose clamp assemblies 50 around the rounded surface 52 and through slots of the first slot pairs 20 or the second slot pairs 22 (as shown), then tighten the hose clamp assemblies such that the hose clamp assemblies 50 urge the flaps 18 into engagement with the rounded surface 52. In the embodiment illustrated, the folded busbar 10 is configured to simultaneously receive a plurality of the hose clamp assemblies 50 (see FIGS. 4A and 4C) to allow a better distribution of loading and overall engagement with the rounded surface 52. In other embodiments, other configurations are possible.

In some embodiments, as also discussed above, the flaps 18 can include two or more sets of the first slot pairs 20 and/or the second slot pairs 22 (or other similarly configured openings), which can be spaced apart so as to distribute any forces received by folded busbar 10. Further, as also discussed above, different sets of the slots (e.g., a first set including the first slot pairs 20 and a second set including the second slot pairs 22) can be configured for use to secure the folded busbar 10 to rounded surfaces of different characteristic diameters. For example, in the embodiment illustrated, the first slot pairs 20 may be configured to receive a hose clamp assembly 50a (see FIG. 4B) that has a relatively small circumference, and the second slot pairs 22 may be configured to receive a hose clamp assembly (e.g., the assembly 50) having a relatively large circumference.

Correspondingly, a particular set of the slot pairs 20, 22 and a particular configuration of the hose clamp assembly 50 is passed through can be selected based on the diameter of the rounded surface 52 to which the folded busbar 10 is to be mounted. For example, if the rounded surface 52 has a relatively large diameter (e.g., approximately 4 inches), the hose clamp assembly 50 can be passed through the second slot pairs 22 and around the rounded surface 52 to appropriately secure the folded busbar 10 to the rounded surface 52. Similarly, if the rounded surface 52 has a relatively small diameter (e.g., approximately 2 inches), a somewhat smaller hose clamp assembly (not shown) can be passed through the first slot pairs 20 and around the rounded surface 52 to appropriately secure the folded busbar 10 to the rounded surface 52.

In other arrangements, other configurations are possible. For example, in some arrangements, the first slot pairs 20 can be used to receive a relatively large hose clamp 50b (see FIG. 4B). Similarly, either of the slot pairs 20, 22 can be used with any variety of hose clamp sizes, as appropriate for a particular installation.

As another example, in some arrangements, a hose clamp of relatively small diameter can be used with a set of inner slots, such as the first slot pairs 20, in order to attach the folded busbar 10 to a relatively small pipe (or other structure). This may be useful, for example, because it may be possible to readily seat a relatively small pipe fully between the slots of the slot pairs 20. The pipe can accordingly, for example, be secured using the slot pairs 20 while employing the smallest possible pipe clamp. Further, this arrangement may help to maximize the surface area of contact between the pipe and the hose clamp.

Likewise, in some arrangements, a pipe of relatively large diameter may extend past a set of inner slots, such as the first slot pairs 20, when seated centrally on the flaps 18. In such arrangements, for example, it may be useful to secure the pipe using a set of outer slots, such as slots of the second slot pairs 22, because a user may be able to more readily access the second (outer) slot pairs 22 than the first (inner) slot pairs 20.

In contrast, in some arrangements, it may be useful to secure a pipe of relatively large diameter using slots of an inner set of slots, such as the first slot pairs 20. For example, for pipes that extend beyond the second slot pairs 22 when centered on the flaps 18, securing the pipes using slots of the first slot pairs 20 rather than slots of the second slot pairs 22 may help to reduce the amount of bending of the relevant hose clamp(s) at contact points with the folded busbar 10.

Like the distributed arrangement of the slot pairs 20, 22 (or other similar mounting openings), an angled configuration for the flaps 18 (e.g., as illustrated in the various FIGS.) can also allow for relatively easy and secure attachment of the folded busbar 10 to rounded surfaces of different curvatures. For example, due to the illustrated angled configuration, the flaps 18 can be ensured of contacting, at at least two spatially separated locations, curved surfaces that exhibit a wide range of diameters (see FIG. 4C). Particularly in combination with the distributed arrangement of the slot pairs 20, 22 (e.g., to accommodate different sizes of hose clamps), this configuration can allow for the folded busbar 10 (or other busbars according to the invention) to be securely and easily attached to a wide variety of structures without necessarily requiring structural reconfiguration of the folded busbar 10 or substitution of differently sized alternative busbars.

Figure 5B:
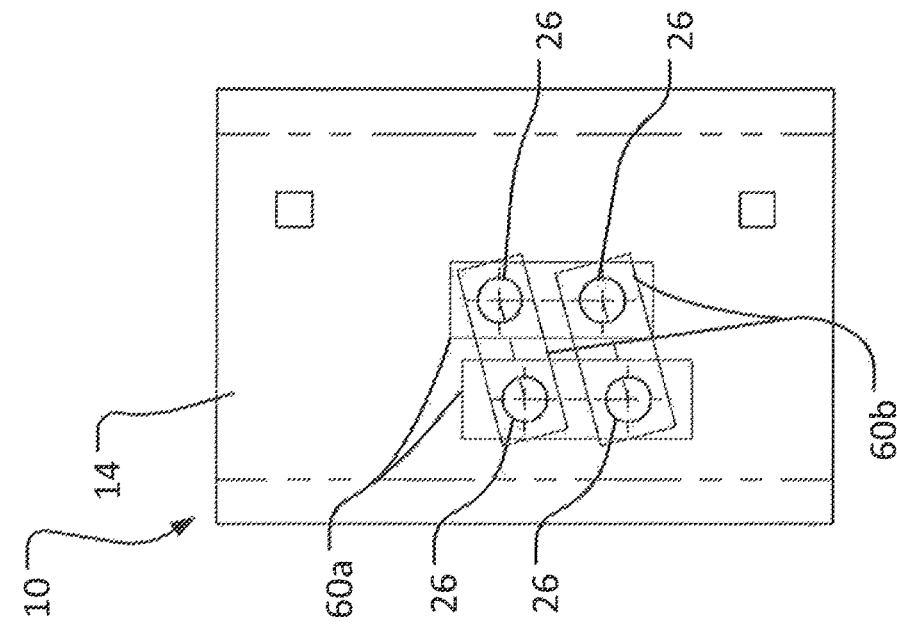
FIG. 5B is a side view of the folded busbar of FIG. 1 showing alternative orientations for securing bonding lugs to the folded busbar, with the bonding lugs rendered partly transparently.
Figure 5A:
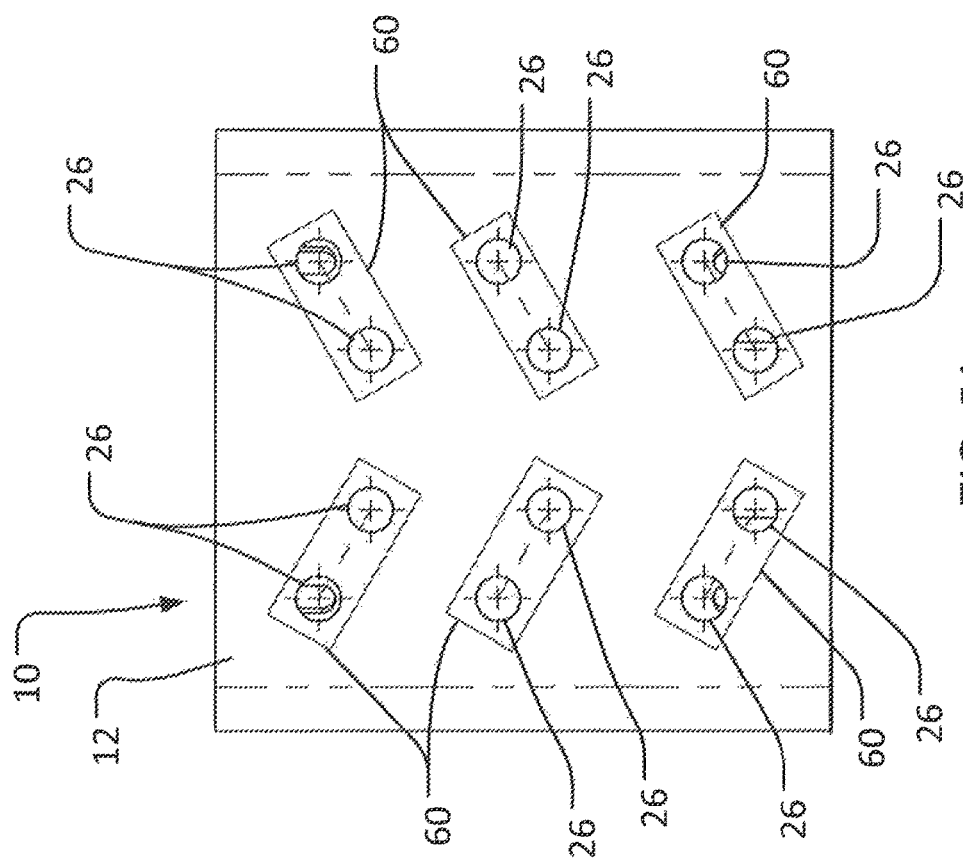
FIG. 5A is a bottom view of the folded busbar of FIG. 1 with bonding lugs secured at mounting holes of the folded busbar, with the bonding lugs rendered partly transparently.

In some embodiments, busbars according to the invention can allow for grounding connections to be secured to a busbar in a variety of orientations or locations. For example, in the embodiment illustrated, the main bonding wall 12, the first mounting wall 14, and the second mounting wall 16 are each configured to accommodate a plurality of bonding lugs, in different orientations. In particular, turning now to FIGS. 5A and 5B, different orientations for mounting bonding lugs 60 (e.g., double-hole, threadably mountable lugs) to the mounting holes 26 of the folded busbar 10 are shown. In some embodiments, the flaps 18 can also be configured with mounting holes 26 to also receive bonding lugs 60 (e.g., for use when the folded busbar 10 is installed as illustrated in FIG. 3C).

In some embodiments, the orientation and location of the mounting holes 26 may determine the orientations in which the bonding lugs 60 (or other connectors) may be mounted on the folded busbar 10. In some embodiments, the orientation and location of the mounting holes 26 can provide flexibility in the installed location and orientation of the bonding lugs 60 (or other connectors). For example, FIG. 5B in particular shows a four-hole diamond configuration of the mounting holes 26 on the first mounting wall 14 that allows the bonding lugs 60 to be installed in at least two different orientations relative to the folded busbar 10. For example, as illustrated, the bonding lugs 60 may be selectively mounted in a substantially vertical orientation (as indicated by reference numbers 60a) or at a different angle (e.g., as indicated by reference numbers 60b). This may be useful, for example, in order to readily accommodate grounding conductors (not shown) that extend in a variety of directions.

In some embodiments, the bonding lugs 60 can be coupled to the folded busbar 10 after the folded busbar 10 is securely mounted to the flat surface 40 (see FIG. 3C) or the rounded surface 52 (see FIG. 4C), as may be useful to secure a conductor (not shown) to the either of the surfaces 40, 52. In some embodiments, one of the groups of mounting holes 26 can be provided with a separate one of the bonding lugs 60 that is configured to be bonded to a telecommunications tower or electrode in electrical communication with the ground source. In some embodiments, a separate bonding clamp may be used to bond the bonding lug 60 to a tower, a building lightning protection system, a ground electrode, a master ground bar (MGB), or another ground source. The bonding lugs 60 (or other connectors) may then be coupled to the remaining mounting holes 26 present on folded busbar 10, where they can be configured to receive a lead wire from respective pieces of electrical equipment in order to place that piece of electrical equipment in electrical communication with the ground source.

In some embodiments, bolt heads and washers (or other hardware) used for mounting the bonding lugs 60 to the folded busbar 10 can be located on the exterior of the folded busbar 10, while nuts are located within the recess 10a of the folded busbar 10. In other embodiments, other configurations are possible. Further, although the bonding lugs 60 are illustrated and discussed above as double-hole lugs, in some installations other types of lugs or other mounting techniques may be used in conjunction with the folded busbar 10 (or other busbars according to the invention).

In some embodiments, the folded busbar 10 can be formed from copper, including from a copper blank that is stamped in a progressive die operation into the desired shape. For example, a single-piece copper blank can first be stamped with openings for the slot pairs 20, 22, the clamp holes 24, and the mounting holes 26, and then bent to form the walls 12, 14, 16 and the flaps 18. In some embodiments, in order to provide additional resistance to corrosion, the folded busbar 10 can be provided with a relatively thin tin coating.

Figure 2A:
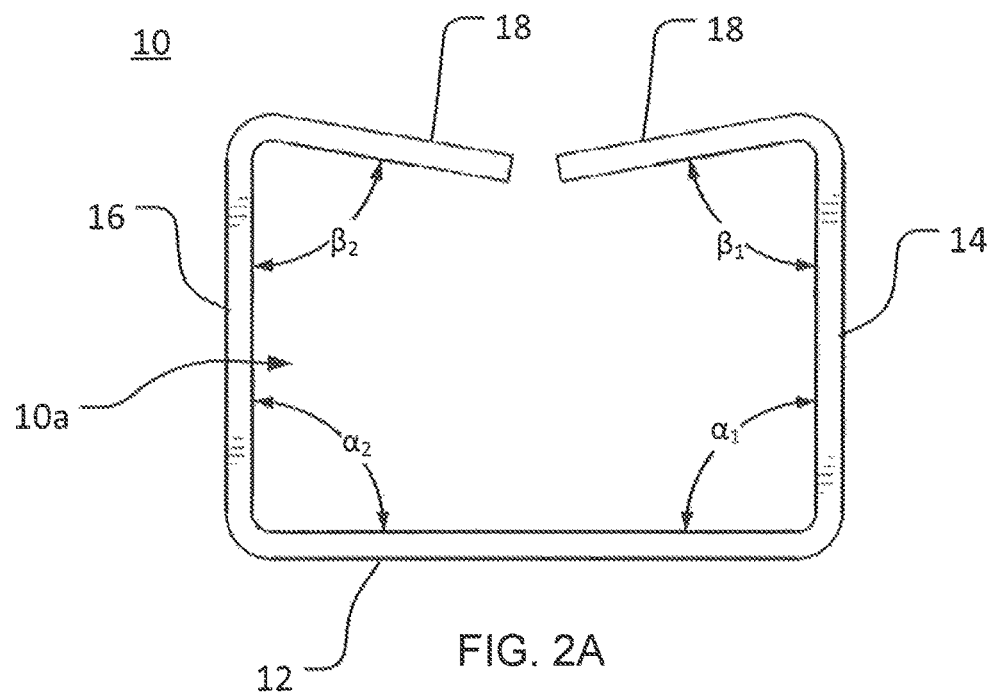
FIG. 2A is a front view of the folded busbar of FIG. 1.
Figure 2B:
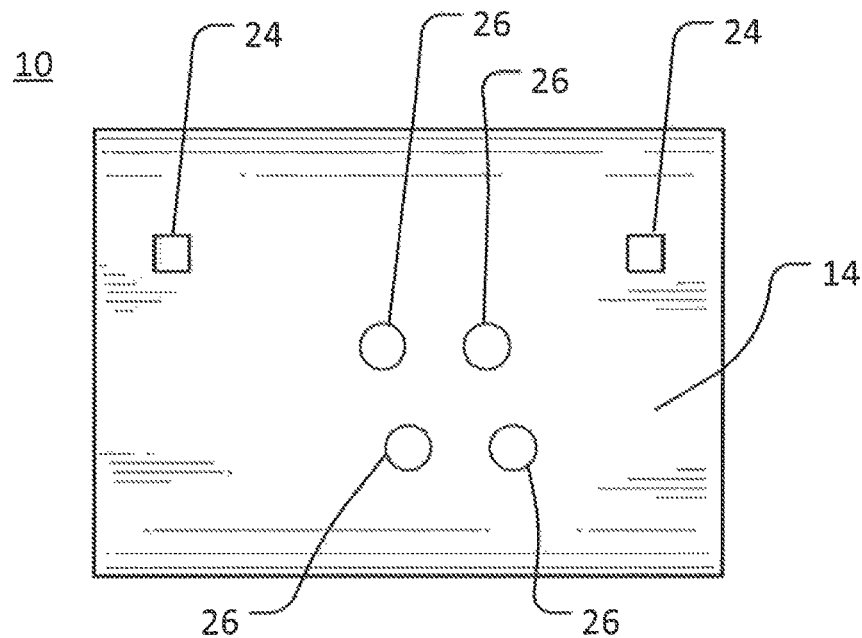
FIG. 2B is a side view of the folded busbar of FIG. 1
Figure 2C:
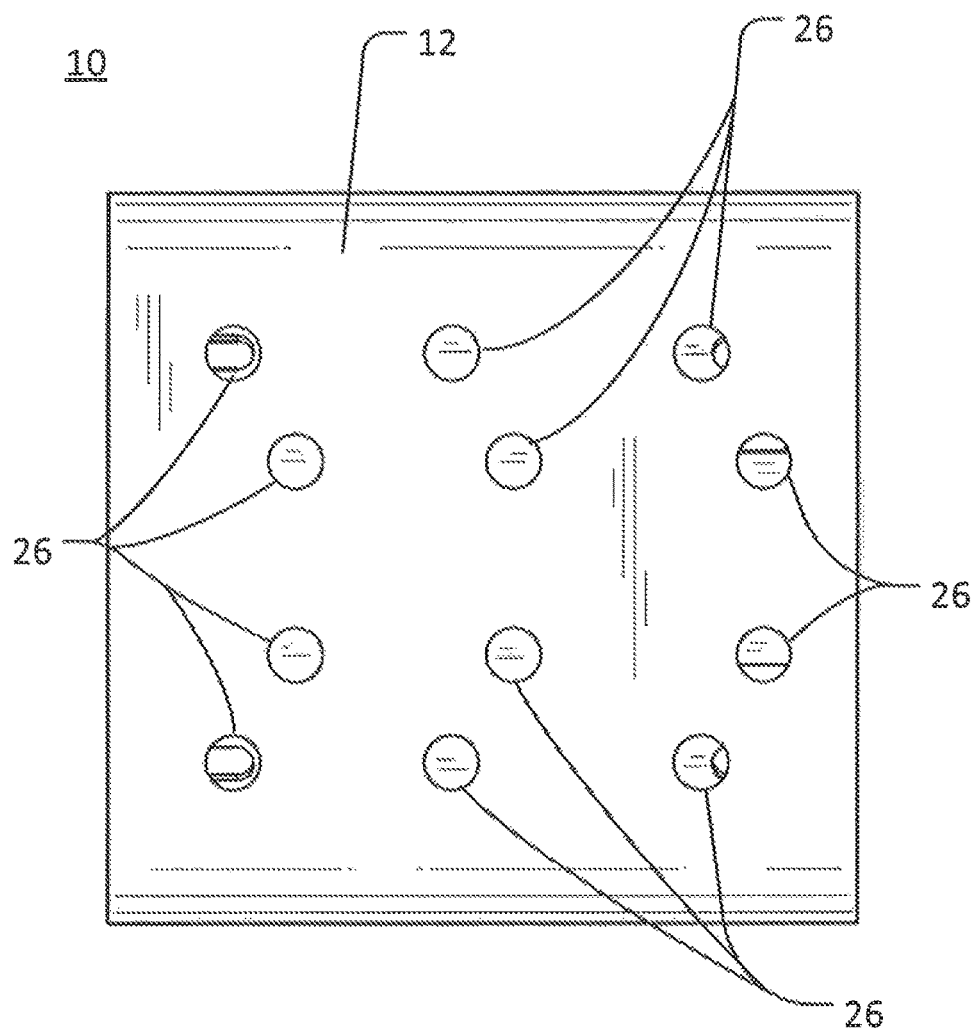
FIG. 2C is a bottom view of the folded busbar of FIG. 1.

In some embodiments, the folded busbar 10 can be manufactured using a three-stage stamping process. For example, in the first stage, holes can be punched into a stock piece of copper that may be about 18 inches long, about 6 inches wide, and about 0.25 inches thick. These holes may include holes for the first slot pair 20, the second slot pair 22, the clamp holes 24, the mounting holes 26, or any other hole, as appropriate. The second stage can then include folding the flaps 18 to the angles $\beta_1$ and $\beta_2$ as illustrated in FIG. 2A (e.g., to about 80°, as also noted above). The third stage of the stamping process can then include further folding the partially stamped product to define the first and second mounting walls 14, 16 with elbows having the angles $\alpha_1$ and $\alpha_2$ as illustrated in FIG. 2A (e.g., about 90°). Once the appropriate holes and angles are in place, the folded busbar 10 can then be given a thin tin coating, as desired.

As also noted above, in other embodiments, other configurations are possible. For example, the various elbows discussed above generally exhibit simple, single-angle configurations (e.g., as reflected in the illustrated angles $\alpha_1$, $\alpha_2$, $\beta_1$, and $\beta_2$). In other embodiments, compound elbows (e.g., with two or more bends) or more generally curved elbows can be used.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A busbar for use with a first hose clamp of a first size and a second hose clamp of a second, different size, for selectively attaching a conductor to a first round support structure of a first diameter, a second round support structure of a second diameter different from the first diameter, and a flat support structure, the busbar comprising:
   a main bonding wall having a first end and a second end;
   a first mounting wall extending away from the first end of the main bonding wall;
   a second mounting wall extending away from the second end of the main bonding wall;
   a first flap extending at an angle from the first mounting wall towards the second mounting wall and the main bonding wall;
   a second flap extending at an angle from the second mounting wall towards the first mounting wall and the main bonding wall; and
   first and second sets of slots, with a first slot of each of the first and second sets of slots extending through the first flap and a second slot of each of the first and second sets of slots extending through the second flap;
   wherein the first and second slots of the first set of slots are disposed between the first and second slots of the second set of slots and are configured to receive the first hose clamp to secure the busbar to the first round support structure; and
   wherein the first and second slots of the second set of slots are configured to receive the second hose clamp to secure the busbar to the second round support structure.

2. The busbar of claim 1, wherein the first flap extends away from the first mounting wall at an angle of between 60° and 90.

3. The busbar of claim 2, wherein the second flap extends away from the second mounting wall at an angle of between 60° and 90°.

4. The busbar of claim 3, wherein the first flap extends away from first mounting wall at an angle of 80° and the second flap extends away from the second mounting wall at an angle of 80°.

5. The busbar of Claim 1, wherein first mounting holes extend through at least one of the first mounting wall or the main bonding wall, the first mounting holes being configured to selectively receive a first double-hole bonding lug with the first double-hole bonding lug in at least two different orientations.

6. The busbar of claim 5, wherein second mounting holes extend through the second mounting wall, the second mounting holes being configured to selectively receive a second double-hole bonding lug with the second double-hole bonding lug in at least two different orientations.

7. The busbar of claim 5, wherein one or more second mounting holes extend through the first mounting wall, the one or more second mounting holes being configured to receive a plurality of beam clamp assemblies independently of the first mounting holes.

8. The busbar of claim 5, wherein the first mounting holes include at least four mounting holes arranged in a diamond pattern.

9. The busbar of claim 1, wherein the main bonding wall, the first mounting wall, and the second mounting wall collectively at least partly define a recess; and
   wherein the first flap and the second flap extend separately across a portion of the recess to define a gap between a distal end of the first flap and a distal end of the second flap.

10. The busbar of claim 1, wherein the first and second mounting walls extend, respectively, from the first and second ends of the main bonding wall at an angle of 90°.

11. The busbar of claim 1, wherein the busbar is formed of copper.

12. The busbar of claim 11, wherein the busbar includes a tin coating.

13. A busbar for selective attachment to a first round support structure of a first diameter, a second round support structure of a second diameter different from the first diameter, and a flat support structure, in order to selectively secure bonding connections relative to the first round support structure, the second round support structure, or the flat support structure, the busbar comprising:
   a single-piece body including:
      a base wall;
      first and second side walls extending from opposite ends of the base wall;
      a first flap extending at a first acute angle from the first side wall opposite the base wall; and
      a second flap extending at a second acute angle from the second side wall opposite the base wall;
   each of the first and second flaps including one or more sets of round-structure mounting openings;

at least one of the base wall, the first side wall, or the second side wall including one or more sets of flat-structure mounting openings; and at least one of the base wall, the first side wall, or the second side wall including one or more sets of bonding openings configured to secure one or more of the bonding connections to the busbar;

the one or more sets of round-structure mounting openings being configured to receive one or more hose clamps to selectively secure the busbar to the first round support structure and the second round support structure, with the first and second flaps urged into engagement with the first round support structure and the second round support structure, respectively; and the one or more sets of flat-structure mounting openings being configured to receive one or more clamp assemblies to selectively secure the busbar to the flat support structure.

14. The busbar of claim 13, for use with a first hose clamp of a first size and a second hose clamp of a second, different size, wherein the one or more sets of round-structure mounting openings include first and second sets of slots, with a first slot of each of the first and second sets of slots extending through the first flap and a second slot of each of the first and second sets of slots extending through the second flap;

wherein the first and second slots of the first set of slots are disposed between the first and second slots of the second set of slots and are configured to receive the first hose clamp to secure the busbar to the first round support structure; and wherein the first and second slots of the second set of slots are configured to receive the second hose clamp to secure the busbar to the second round support structure.

15. The busbar of claim 13, wherein the one or more sets of bonding openings include at least four mounting holes configured to selectively receive a first double-hole bonding lug with the first double-hole bonding lug in at least two different orientations.

16. The busbar of claim 13, wherein the first flap extends away from the first side wall at a first angle of greater than 60°; and wherein the second flap extends away from the second side wall at a second angle of greater than 60°.

17. The busbar of claim 16, wherein the first angle is substantially equal to the second angle.

18. The busbar of claim 16, wherein the first and second flaps extend towards each other to define a gap between distal ends of the first and second flaps.

19. A method of manufacturing a busbar that is configured to be selective attached to a first round support structure of a first diameter, a second round support structure of a second diameter different from the first diameter, and a flat support structure, in order to selectively secure bonding connections relative to the first round support structure, the second round support structure, or the flat support structure, the method comprising:

providing a single-piece copper blank; and stamping the single-piece copper blank to form:

a plurality of mounting openings and a plurality of bonding openings;

a first wall that includes a first set of the plurality of bonding openings;

second and third walls that extend from opposite ends of the first wall and that include, respectively, second and third sets of the pluralities of bonding openings and at least one of the mounting openings that is configured to attach of the busbar to the flat support structure; and first and second flaps extending at acute angles from the second and third walls, respectively, with the first and second flaps including, respectively, first and second sets of the plurality of mounting openings that are configured to attach the busbar to the first and second round support structures, respectively.

* * * * *